3,632,768
THERAPEUTIC COMPOSITION AND METHOD FOR TREATING INFECTIONS WITH ACTINOSPECTACIN
Malcolm E. Bergy, Kalamazoo, and Clarence De Boer, Kalamazoo Township, Kalamazoo County, Mich., assignors to The Upjohn Company, Kalamazoo, Mich.
No Drawing. Continuation of application Ser. No. 611,586, Jan. 25, 1967, which is a continuation-in-part of application Ser. No 507,241, Nov. 10, 1965, which in turn is a continuation-in-part of application Ser. No. 847,091, Oct. 19, 1959. This application Oct. 2, 1969, Ser. No. 863,336
Int. Cl. A61k 21/00
U.S. Cl. 424—278
9 Claims

ABSTRACT OF THE DISCLOSURE

Actinospectacin (spectinomycin) prepared in unit dosage form in combination with pharmaceutical carriers and the process of treating humans and animals for bacterial infections, parasitic worms, and PPLO infections.

CROSS REFERENCES TO RELATED APPLICATIONS

This application is a continuation of copending application Ser. No. 611,586, filed Jan. 25, 1967, now abandoned, which is a continuation-in-part of copending application Ser. No. 507,241 filed Nov. 10, 1965, now abandoned, which in turn is a continuation-in-part of application 847,091, filed Oct. 19, 1959, now abandoned.

BRIEF SUMMARY OF INVENTION

This invention relates to novel compositions and more particularly to compositions having actinospectacin as an essential active ingredient in association with a pharmaceutical carrier, said compositions being useful for the therapeutic treatment of humans and animals hosting bacterial and other parasitic infestations.

DETAILED DESCRIPTION

Actinospectacin, also known as spectinomycin, is a biosynthetic product obtainable by the controlled fermentation of *Streptomyces spectabilis* (Great Britain Pat. 811,757, Apr. 8, 1959) and has the property of adversely affecting the growth of various organisms, particularly bacteria. It is a basic compound capable of forming acid addition salts and is useful in both the free base form and acid addition salt forms.

Actinospectacin and the acid addition salts thereof can be prepared by methods disclosed in application Ser. No. 847,092 filed Oct. 20, 1959, now U.S. Pat. No. 3,234,092.

The compositions of the present invention are preferably presented for administration to humans and animals in unit dosage forms, such as tablets, capsules, powders, granules, sterile parenteral solutions or suspensions, and oral solutions or suspensions, containing at least about 50 mg. of actinospectacin or its pharmacologically acceptable salts.

For oral administration either solid or fluid unit dosage forms can be prepared. For preparing solid compositions such as tablets, the principal active ingredient is mixed with conventional ingredients such as talc, magnesium stearate, dicalcium phosphate, magnesium aluminum silicate, starch, lactose, acacia, methylcellulose, and functionally similar materials as pharmaceutical diluents or carriers. The tablets can be laminated or otherwise compounded to provide a dosage form affording the advantage of prolonged or delayed action or predetermined successive action of the enclosed medication. For example, the tablet can comprise an inner dosage and an outer dosage component, the latter being in the form of an envelope over the former. The two components can be separated by an enteric layer which serves to resist disintegration in the stomach and permits the inner component to pass intact into the duodenum or to be delayed in release. A variety of materials can be used for such enteric layers or coatings, such materials including a number of polymeric acids or mixture of polymeric acids with such materials as shellac, cetyl alcohol, cellulose acetate phthalate, styrene maleic acid copolymer and the like. Alternatively, the two component system can be utilized for preparing tablets containing two or more incompatible active ingredients. Wafers are prepared in the same manner as tablets, differing only in shape and the inclusion of sucrose or other sweetener and flavor. In their simplest embodiment, capsules, like tablets, are prepared by mixing the antibiotic with an inert pharmaceutical diluent and filling the mixture into a hard gelatin capsule of appropriate size. In another embodiment, capsules are prepared by filling hard gelatin capsules with polymeric acid coated beads containing the antibiotic. Soft gelatin capsules are prepared by machine encapsulation of a slurry of the antibiotic with light liquid petrolatum or other inert oil.

Fluid unit dosage forms for oral administration such as syrups, elixirs, and suspensions can be prepared. The water-soluble forms can be dissolved in an aqueous vehicle together with sugar, aromatic flavoring agents and preservatives to form a syrup. An elixir is prepared by using a hydro-alcoholic (ethanol) vehicle with suitable sweeteners such as sugar, saccharin, and cyclamate together with an aromatic flavoring agent. Suspensions can be prepared of the insoluble forms with a syrup vehicle with the aid of a suspending agent such as acacia, tragacanth, methylcellulose and the like.

Topical ointments can be prepared by dispersing the antibiotic in a suitable ointment base such as petrolatum, lanolin, polyethylene glycols, mixtures thereof, and the like. Advantageously, the antibiotic is finely divided by means of a colloid mill utilizing light liquid petrolatum as a levigating agent prior to dispersing in the ointment base. Topical creams and lotions are prepared by dispersing the antibiotic in the oil phase prior to the emulsification of the oil phase in water.

For parenteral administration, fluid unit dosage forms are prepared utilizing the antibiotic and a sterile vehicle, water being preferred. The antibiotic, depending on the form and concentration used, can be either suspended or dissolved in the vehicle. In preparing solutions the water-soluble antibiotic can be dissolved in water for injection and filter sterilized before filling into a suitable vial or ampule and sealing. Advantageously adjuvants such as a local anesthetic, preservative and buffering agents can be dissolved in the vehicle. To enhance the stability, the composition can be frozen after filling into the vial and the water removed under vacuum. The dry lyophilized powder is then sealed in the vial and an accompanying vial of water for injection is supplied to reconstitute the powder prior to use. Parenteral suspensions are prepared in substantially the same manner except that the antibiotic is suspended in the vehicle instead of being dissolved and sterilization cannot be accomplished by filtrate. The antibiotic can be sterilized by exposure to ethylene oxide before suspending in the sterile vehicle. Advantageously, a surfactant or wetting agent is included in the composition to facilitate uniform distribution of the antibiotic.

The term unit dosage form as used in the specification and claims refers to physically discrete units suitable as unitary dosages for human subjects and animals, each unit containing a predetermined quantity of active material calculated to produce the desired therapeutic effect in association with the required pharmaceutical diluent, carrier or vehicle. The specifications for the novel unit dosage forms of this invention are dictated by and directly dependent on (a) the unique characteristics of the active material and the particular therapeutic effect to be achieved, and (b) the limitations inherent in the art of compounding such an active material for therapeutic use in humans and animals, as disclosed in detail in this specification, these being features of the present invention. Examples of suitable unit dosage forms in accord with this invention are tablets, capsules, troches, suppositories, powder packets, granules, wafers, cachets, teaspoonfuls, tablespoonfuls, dropperfuls, ampules, vials, segregated multiples of any of the foregoing, and other forms as herein described.

In addition to the administration of actinospectacin as the principal active ingredient of compositions for the treatment of the conditions described herein, the said actinospectacin can be included with other types of compounds to obtain advantageous combinations of properties. Such combinations include actinospectacin with antibiotics such as chloramphenicol, tetracyclines, e.g., tetracycline, oxytetracycline and chlortetracyline, penicillin, erythromycin, novobiocin, neomycin, polymyxin, bacitracin, nystatin, fumagillin and endomycin to broaden the bacterial spectrum of the composition and for synergistic action against particular bacteria; steroid having anti-inflammatory activity such as hydrocortisone, prednisolone, 6α-methylprednisolone, 6α-fluoroprednisolone and the like; analgesics such as aspirin, sodium salicylate, (acetylsalicylic acid)-anhydride, N-acetyl-p-aminophenol and salicylamide; antihistamines, such as chlorpheniramine maleate, diphenhydramine, promethazine, pyrathiazine, and the like; and the vitamins.

The dosage of actinospectacin for treatment depends on route of administration; the age, weight, and condition of the patient; and the particular disease to be treated. A dosage schedule of from about 50 mg. to 2 grams, 1 to 4 times daily, embraces the effective range for the treatment of most conditions for which the compounds are effective. The actinospectacin is compounded with a suitable pharmaceutical carrier in unit dosage form for convenient and effective administration. In the preferred embodiments of this invention, the dosage units contain actinospectacin in 50 mg., 125 mg., 250 mg., 500 mg., 1 gm., and 2 gm. amounts for systemic treatment and in 0.5, 1.5, 3, and 10% amounts for topical or localized treatment. The dosage of compositions containing actinospectacin and one or more other active ingredients is to be determined with reference to the usual dosage of each such ingredient.

Actinospectacin sulfate has exhibited the following characteristic properties:

ANTIMICROBIAL ACTIVITY (IN VITRO)

TABLE I

Test organism (in brain heart broth): Minimum inhibitory concentration (MIC) mcg./ml. (at 20 hrs.)

| Organism | MIC |
|---|---|
| Staphylococcus aureus | 250 |
| Streptococcus hemolyticus | 64 |
| Streptococcus viridans | 500 |
| Streptococcus faecalis | 250 |
| Diplococcus pneumoniae | 64 |
| Pasteurella multocida | 22 |
| Salmonella typhi | 64 |
| Proteus vulgaris | 250 |
| Escherichia coli | 64 |
| Pseudomonas aeruginosa | 250 |
| Salmonella paratyphi B | 125 |
| Klebsiella pneumoniae | 64 |
| Salmonella pullorum | 64 |
| Staphylococcus albus | 32 |

The in vivo antibacterial spectrum is shown in Table II.

The data in the Table II were obtained in mice and represent the dosage necessary to obtain 50% survival of infected animals. In untreated controls none of the infected mice survive.

TABLE II

| Organism | Median protective dose subcutaneous | $(CD_{50})$* oral |
|---|---|---|
| Staphlococcus aureus | 40. | 314 |
| Streptococcus viridans | 22.5 | 714 |
| Streptococcus hemolyticus | 57 | >800 |
| Diplococcus pneumoniae I | 66 | >800 |
| Pasteurells multocida | 194 | >800 |
| Klebsiella pneumoniae | 14 | 355 |
| Escherichia coli | 26 | 112 |
| Proteus vulgaris | 22.5 | 120 |
| Pseudomonas aeruginosa | >320 | >800 |
| Salmonella paratyphi B | >320 | >800 |
| Salmonella typhimurium | 208 | |

*As mg./kg./day.

The in vivo testing in mice also shows that the maximum tolerated dose (MTD) was >400 mg./kg. subcutaneously and >1000 mg./kg. orally, and that the $LD_{50}$ intraperitoneally was >2000 mg./kg.

The novel compositions of the present invention comprising actinospectacin in the form of the free base or pharmacologically acceptable acid addition salts as the principal active ingredient in combination with a pharmaceutical carrier or diluent are useful in the treatment of humans and animals for various pathological conditions arising out of parasitic infestations. The compositions provide a means for administering the therapeutic ingredient by the parenteral and oral routes for systemic treatment as well as localized or topical treatment. The compositions provide a method of therapy for tonsillitis, pneumonia, otitis, conjunctivitis, boils, orchitis and other infectious conditions of humans due to the presence of bacteria such as those shown in Table I. The compositions are also useful parenterally in the treatment of veneral disease, particularly gonorrhea and syphilis in humans.

In animals, the compositions are similarly useful for infestations of bacterias as shown in Tables I and II. The compositions can be administered orally for the treatment of parasitic worms; for example, large roundworms, whipworms, and nodular worms in pigs. Animals raised for meat can be given prophlyactic treatment for increased weight gains.

Chickens and other poultry infected with *Salmonella pullorum* can be treated, and poultry infected with PPLO organisms can similarly be treated.

The following examples are illustrative of the best mode contemplated by the inventors for carrying out their invention and are not to be construed as limiting.

EXAMPLE 1

*Capsules*

One thousand two-piece hard gelatin capsules for oral use, each containing 250 mg. of actinospectacin sulfate, are prepared from the following types and amounts of materials:

| | Gm. |
|---|---|
| Actinospectacin sulfate | 250 |
| Corn starch | 150 |
| Talc | 75 |
| Magnesium stearate | 25 |

The materials are thoroughly mixed and then encapsulated in the usual manner.

The foregoing capsules are useful for the treatment of infection in adult humans by the oral administration of 1 capsule every 4 hours.

Using the procedure above, capsules are similarly prepared containing actinospectacin sulfate in 50 mg., 125 mg., 500 mg., 1 gm., and 2 gm. amounts by substituting 50, 125, 500, 1000, and 2000 gm. of actinospectacin sulfate for the 250 gm. used above.

EXAMPLE 2

Capsules

One thousand two-piece hard gelatin capsules for oral use, each containing 250 mg. of actinospectacin and 250 mg. of tetracycline, are prepared from the following types and amounts of ingredients:

|  | Gm. |
|---|---|
| Actinospectacin | 250 |
| Tetracycline | 250 |
| Talc | 75 |
| Magnesium stearate | 25 |

The ingredients are thoroughly mixed and then encapsulated in the usual manner.

The foregoing capsules are useful for the treatment of infection in adult humans by the oral administration of 1 capsule every 6 hours.

Using the procedure above, capsules are similarly prepared containing actinospectacin and each of the following antibiotics in place of tetracycline by substituting 250 gm. of such other antibiotic for tetracycline; chloramphenicol, oxytetracycline, chlortetracycline, endomycin, fumagillin, erythromycin, streptomycin, dihydrostreptomycin and novobiocin. When a penicillin, such as potassium penicillin G, is to be used in place of tetracycline, 250,000 units per capsule is employed.

Such combination products are useful for the systemic treatment of mixed infections in adult humans by the oral administration of 1 capsule every 6 hours.

EXAMPLE 3

Tablets

One thousand tablets for oral use, each containing 500 mg. of actinospectacin sulfate, are prepared from the following types and amounts of materials:

|  | Gm. |
|---|---|
| Actinospectacin sulfate | 500 |
| Lactose | 125 |
| Corn starch | 65 |
| Magnesium stearate | 25 |
| Light liquid petrolatum | 3 |

The ingredients are thoroughly mixed and slugged. The slugs are broken down by forcing through a number sixteen screen. The resulting granules are then compressed ino tablets, each tablet containing 500 mg. of actinospectacin sulfate.

The foregoing tablets are useful for treatment of infections in adult humans by oral administration of 1 tablet every 4 hours.

Using the above procedure, except for reducing the amount of actinospectacin sulfate to 250 gm., tablets containing 250 mg. of actinospectacin sulfate are prepared.

EXAMPLE 4

Tablets

One thousand oral tablets, each containing 125 mg. of actinospectacin sulfate and a total of 250 mg. (83.3 mg. each) of sulfadiazine, sulfamerazine, and sulfamethazine, are prepared from the following types and amounts of materials:

|  | Gm. |
|---|---|
| Actinospectacin sulfate | 125 |
| Sulfadiazine | 83.3 |
| Sulfamerazine | 83.3 |
| Sulfamethazine | 83.3 |
| Lactose | 50 |
| Corn starch | 50 |
| Calcium stearate | 25 |
| Light liquid petrolatum | 5 |

The ingredients are thoroughly mixed and slugged. The slugs are broken down by forcing through a number sixteen screen. The resulting granules are then compressed into tablets, each containing 125 mg. of actinospectacin sulfate and a total of 250 mg. (83.3 mg. each) of sulfadiazine, sulfamerazine, and sulfamethazine.

The foregoing tablets are useful for treatment of infections by the oral administration of 4 tablets first and then 1 every six hours.

EXAMPLE 5

Granules 2367 gm. of a granulation suitable for reconstitution with water prior to use is prepared from the following types and amounts of ingredients:

|  | Gm. |
|---|---|
| Actinospectacin | 150 |
| Tetracycline | 150 |
| Lecithin | 5 |
| Sucrose, powdered | 2000 |
| Flavor | 60 |
| Sodium metabisufite | 2 |

The actinospectacin and tetracycline are finely divided and coated with the lecithin. The coated antibiotics, powdered, sugar, flavor, and sodium metabisulfite are mixed together until thoroughly blended. The powder mixture is wetted with water and forced through a screen to form granules. The granules are dried and 23.67 gm. filled into 60 cc. bottle. Prior to use sufficient water is added to the granules to make 60 cc. of composition.

The foregoing composition is useful for treatment of infection, particularly in children at a dose of one teaspoon 4 times daily.

EXAMPLE 6

Oral syrup 1000 cc. of an aqueous suspension for oral use, containing in each 5 cc. dose, one-half gram of total sulfas and 250 mg. of actinospectacin sulfate, is prepared from the following types and amounts of ingredients:

|  | Gm. |
|---|---|
| Actinospectacin sulfate | 50 |
| Sulfadiazine | 33.3 |
| Sulfamerazine | 33.3 |
| Sulfamethazine | 33.3 |
| Citric acid | 2 |
| Benzoic acid | 1 |
| Sucrose | 700 |
| Tragacanth | 5 |
| Lemon oil | 2 |
| Deionized water q.s. 1000 cc. | |

The citric acid, benzoic acid, sucrose, tragacanth, and lemon oil are dispersed in sufficient water to make 850 cc. of solution. The actinospectacin sulfate and finely powdered sulfas are stirred into the syrup until uniformly distributed. Sufficient water is added to make 1000 cc.

EXAMPLE 7

Parenteral suspension

A sterile aqueous suspension for intramuscular use, containing in 1 cc. 250 mg. of actinospectacin, is prepared from the following types and amounts of materials:

|  | Gm. |
|---|---|
| Actinospectacin | 250 |
| Sodium carboxymethylcellulose, low viscosity | 7.5 |
| Polyvinylpyrrolidone | 7.5 |
| Polysorbate 80 | 4 |
| Methylparaben | 2.5 |
| Propylparaben | .17 |
| Water for injection q.s. 1000 cc. | |

The sodium carboxymethylcellulose, polyvinylpyrrolidone and polysorbate 80 are dispersed in sufficient water and sterilized by autoclaving at 120° C. for 30 minutes. The finely powdered actinospectacin, methylparaben and propylparaben are sterilized separately by treatment with ethylene oxide, then mixed well in a suitable sterile blender and finally dispersed in the cooled, autoclaved vehicle. The finished sterile suspension is packaged aseptically in sterile vials.

The foregoing parenteral composition is useful in the treatment of urinary infections due to the growth of *Proteus vulgaris* at a dose of 1 cc. (250 mg.) every six hours.

EXAMPLE 8

Parenteral solution

A sterile aqueous solution for intramuscular use, containing in 1 cc. 50 mg. of actinospectacin sulfate, is prepared from the following types and amounts of ingredients:

|  | Gm. |
|---|---|
| Actinospectacin sulfate | 50 |
| Lactose | 50 |
| Water for injection q.s. 1000 cc. | |

The actinospectacin sulfate and lactose are dissolved in the water and the solution sterilized by filtration. The sterile solution, in the amount of 2 cc., is aseptically filled into sterile vials and frozen. The water is removed under high vacuum and the vials containing the lyophilized powder are sealed. Just prior to use, sufficient water for injection to make 2 cc. of solution is added to the vial.

The foregoing parenteral composition is useful in the treatment of systemic infections due to the growth of *Staph aureus* at a dose (child's) of 1 cc. every four hours.

EXAMPLE 9

Topical ointment 1000 gm. of a 3% actinospectacin ointment are prepared from the following types and amounts of ingredients:

|  | Gm. |
|---|---|
| Actinospectacin | 30 |
| Zinc oxide | 50 |
| Calamine | 50 |
| Liquid petrolatum (heavy) | 250 |
| Wool fat | 200 |
| White petrolatum q.s. 1000 gm. | |

The white petrolatum and wool fat are melted and 100 gm. of liquid petrolatum added thereto. The actinospectacin, zinc oxide and calamine are added to the remaining liquid petrolatum and the mixture milled until the powders are finely divided and uniformly dispersed. The powder mixture is stirred into the white petrolatum mixture and stirring continued until the ointment congeals.

The foregoing ointment is usefully applied topically to the skin of mammals for the treatment of infection.

The foregoing composition can be prepared by omitting the zinc oxide and calamine.

Following the procedure above, ointments are similarly prepared containing actinospectacin in 0.5, 1.5, and 10% amounts by substituting 5, 15, and 100 gm. of actinospectacin for the 30 gm. used above.

EXAMPLE 10

Cream 1000 gm. of a vaginal cream are prepared from the following types and amounts of ingredients:

|  | Gm. |
|---|---|
| Actinospectacin sulfate | 50 |
| Tegacid Regulator [1] | 150 |
| Spermaceti | 100 |
| Propylene glycol | 50 |
| Polysorbate 80 | 5 |
| Methylparaben | 1 |
| Deionized water q.s. 1000 gm. | |

[1] Self-emulsifying glyceryl monostearate from Goldschmidt Chemical Corporation, New York, N.Y.

The Tegacid and spermaceti are melted together at a temperature of 70–80° C. The methylparaben is dissolved in about 500 gm. of water and the propylene glycol, polysorbate 80, and actinospectacin are added in turn, maintaining a temperature of 75–80° C. The methylparaben mixture is added slowly to the tegacid and spermaceti melt, with constant stirring. The addition is continued for at least 30 minutes with continued stirring until the temperature has dropped to 40–45° C. The pH of the final cream is adjusted to 3.5 by incorporating 2.5 gm. of citric acid and 0.2 gm. of dibasic sodium phosphate dissolved in about 50 gm. of water. Finally, sufficient water is added to bring the final weight to 1000 gm. and the preparation stirred to maintain homogeneity until cooled and congealed.

The foregoing composition is useful for the treatment of vaginal infections in humans.

EXAMPLE 11

Ointments, ophthalmic 1000 gm. of an ophthalmic ointment containing 1½% actinospectacin sulfate are prepared from the following types and amounts of ingredients:

|  | Gm. |
|---|---|
| Actinospectacin sulfate | 15 |
| Bacitracin | 12.2 |
| Polymyxin B sulfate (10,000 units/mg.) | 1 |
| Light liquid petrolatum | 250 |
| Wool fat | 200 |
| White petrolatum q.s. 1000 gm. | |

The antibiotics are finely divided by means of an air micronizer and added to the light liquid petrolatum. The mixture is passed through a colloid mill to uniformly distribute the antibiotics. The wool fat and white petrolatum are melted together, strained, and the temperature adjusted to 45–50° C. The liquid petrolatum slurry is added and the ointment stirred until congealed. Suitably the ointment is packaged in one dram ophthalmic tubes.

The foregoing ointment is usefully applied to the eye for treatment of localized *Staph. aureus* infection in humans and other animals.

Advantageously the foregoing composition can contain 2 gm. (0.2%) of methylprednisolone for the treatment of inflammation, and, alternatively, the bacitracin and polymyxin B sulfate can be omitted.

EXAMPLE 12

Ophthalmic preparation

One thousand cc. of a sterile aqueous liquid for eye or ear use containing 10 mg. of actinospectacin and 10 mg. of prednisolone in each cc. is prepared from the following types and amounts of ingredients:

|  | Gm. |
|---|---|
| Actinospectacin | 10 |
| Prednisolone succinate sodium | 10 |
| Sodium citrate | 4.5 |
| Polyethylene glycol 4000 | 120 |
| Myristyl-γ-picolinium chloride | 0.2 |
| Polyvinylpyrrolidone | 1 |
| Deoinized water q.s. ad 1000 cc. | |

The ingredients are dispersed in the water and sterilized. The composition is aseptically filled into sterile dropper containers.

The composition so prepared is useful in the topical treatment of inflammation and infection of the eye and ear as well as other sensitive tissues of the animal body.

EXAMPLE 13

Suppository, rectal 1000 suppositories, each weighing 2.5 gm. and containing 125 mg. of actinospectacin sulfate are prepared from the following types and amounts of ingredients:

| | Gm. |
|---|---|
| Actinospectacin sulfate | 125 |
| Polymyxin B sulfate (10,000 units/mg.) | 1.25 |
| Hydrocortisone acetate | 50 |
| Ethyl aminobenzoate | 75 |
| Zinc oxide | 62.5 |
| Propylene glycol | 162.5 |
| Polyethylene glycol 4000 q.s. 2500 gm. | |

The actinospectacin, polymyxin B sulfate, hydrocortisone acetate, ethyl aminobenzoate, and zinc oxide are added to the propylene glycol and the mixture milled until the powders are finely divided and uniformly dispersed. The polyethylene glycol 4000 is melted and the propylene glycol dispersion added slowly with stirring. The suspension is poured into unchilled molds at 40° C. The composition is allowed to cool and solidify and then removed from the mold and each suppository wrapped.

The foregoing suppositories are inserted rectally for local treatment of inflammation and infection.

Alternatively, the foregoing composition can be prepared omitting the steroid.

EXAMPLE 14

*Mastitis ointment*

1000 gm. of an ointment for the treatment of mastitis in dairy cattle is prepared from the following types and amount of ingredients:

| | Gm. |
|---|---|
| Actinospectacin sulfate | 50 |
| Prednisolone acetate | 0.5 |
| Light liquid petrolatum | 300 |
| Chlorobutanol, anhydrous | 5 |
| Polysorbate 80 | 5 |
| 2% Aluminum monostearate-peanut oil gel | 400 |
| White petrolatum q.s. 1000 gm. | |

The actinospectacin sulfate and prednisolone acetate are milled with the light liquid petrolatum until finely divided and uniformly dispersed. The chlorobutanol, polysorbate 80, peanut oil gel and white petrolatum are heated to 120° F. to form a melt and the liquid petrolatum dispersion stirred in. With continued stirring the dispersion is allowed to cool (and congeal) to room temperature and is filled into disposable mastitis syringes in 10 gm. doses.

EXAMPLE 15

*Animal feed pellets*

1000 gm. of a feed mix is prepared from the following types and amounts of ingredients:

| | Gm. |
|---|---|
| Actinospectacin sulfate | 10 |
| Soybean meal | 400 |
| Fish meal | 400 |
| Wheat germ oil | 50 |
| Sorghum molasses | 140 |

The ingredients are mixed together and pressed into pellets weighing about 500 mg. each.

The composition can be fed to laboratory animals, i.e., rats, mice, guinea pigs, and rabbits for prophylaxis during shipping.

For larger animals the composition can be added to the animal's regular feed in an amount calculated to give the desired dose of actinospectacin. For example, the pellets can be added to swine feed in an amount calculated to provide up to 1 gram of actinospectacin per day for the treatment of *Ascaris lumbricoides* and *Trichuris suis* in swine.

EXAMPLE 16

*Parenteral composition*

3,700 vials containing actionspectacin for parenteral administration are prepared from the following types and amounts of ingredients:

Each vial (15 cc.) contains,

| | Gm. |
|---|---|
| 2.115 gram actinospectacin sulfate [1] | 7826 |
| 0.8 gram lactose | 2900 |
| Water for injection q.s. ad 55,500 cc. | |

[1] Equivalent to 1.4 gm. base.

The actinospectacin and lactose are added to 47,500 cc. of water for injection and heated to 70° C. for 30 minutes to dissolve the solids. The solution is cooled to room temperature and sufficient water for injection added to make 55,500 cc. The solution is sterilized by filtration and 15 cc. of solution filled into a 20 cc. vial. The solution is frozen in the vial, freeze-dried, and the vial sealed.

When 1 vital is reconstituted with 5.6 ml. of water for injection, it makes 7 ml. of solution having 200 mg. (base equivalent) of actinospectacin per ml.

The composition is useful in the treatment of gonorrhea in adult humans at a dosage of 7 ml. daily.

EXAMPLE 17

Following the procedure of each of the preceding Examples 1 through 16, each member selected from the group consisting of actinospectacin hydrochloride, actinospectacin nitrate, actinospectacin phosphate, actionspectacin citrate, actinospectacin acetate, actinospectacin succinate, and actinospectacin maleate is substituted in an equivalent amount for the particular form of actinospectacin shown in the example to provide similar therapeutic properties.

EXAMPLE 18

Following the procedure of each of the preceding Examples 1 through 4, each member selected from the group consisting of sodium novobiocin, calcium novobiocin, chlortetracycline hydrochloride, oxytetracycline hydrochloride, tetracycline, tetracycline hydrochloride, and tetracycline phosphate complex is added in 50, 100 and 250 gm. amounts to provide a combination having a much wider spectrum of therapeutic effectiveness in the treatment of infectious diseases resulting from mixed organisms susceptible to actinospectacin as indicated in the present specification and the above indicated antibiotics as already well known to the medicinal art.

What is claimed is:

1. A therapeutic composition for treating humans and animals hosting a parasitic infestation susceptible to actinospectacin comprising in unit dosage form from about 50 mg. to about 2 gm. of a member selected from the group consisting of actinospectacin and its pharmacologically acceptable acid addition salts as an essential active ingredient in combination with a pharmaceutical carrier.

2. The therapeutic composition for treating humans and animals hosting a parasitic infestation susceptible to actinospectacin of claim 1 for parenteral administration wherein the pharmaceutical carrier is a sterile vehicle.

3. The process for treating humans and animals hosting a parasitic infestation susceptible to actinospectacin which comprises the administering to the host an effective amount of a member selected from the group consisting of actinospectacin and its pharmacologically acceptable acid addition salts as an essential active ingredient in combination with a pharmaceutical carrier.

4. The process of clam 3 wherein from about 50 mg. to about 2 grams of a member selected from the group consisting of actinospectacin and its pharmacologically acceptable acid addition salts is administered in unit dosage form in combination with a pharmaceutical carrier.

5. The process of claim 3 wherein the administration to the host is parenteral.

6. The process of claim 3 wherein the host is hosting an actinospectacin susceptible bacterial infestation.

7. The process of claim 3 wherein from about 50 to about 500 mg. of a member selected from the group consisting of actinospectacin and its pharmacologically acceptable acid addition salts is administered in unit dosage form in combination with a pharmaceutical carrier to a host hosting an actinospectacin susceptible bacterial infestation.

8. The process of claim 7 wherein the administration to the host is orally.

9. The process of claim 7 wherein the administration to the host is parenterally.

References Cited
UNITED STATES PATENTS 3,234,092   2/1966   Bergy et al. _____ 424—116

JEROME D. GOLDBERG, Primary Examiner